United States Patent
Yang et al.

(10) Patent No.: US 10,732,634 B2
(45) Date of Patent: *Aug. 4, 2020

(54) CENTRALIZED SCHEDULING SYSTEM USING EVENT LOOP FOR OPERATING AUTONOMOUS DRIVING VEHICLES

(71) Applicant: Baidu USA LLC, Sunnyvale, CA (US)

(72) Inventors: Yiqing Yang, Sunnyvale, CA (US); Siyang Yu, Sunnyvale, CA (US); Xuan Liu, Sunnyvale, CA (US); Yu Cao, Sunnyvale, CA (US); Zhang Li, Sunnyvale, CA (US); Jun Zhan, Sunnyvale, CA (US); Guang Yang, San Jose, CA (US)

(73) Assignee: BAIDU US LLC, Sunnyvale, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/640,842

(22) Filed: Jul. 3, 2017

(65) Prior Publication Data

US 2019/0004854 A1 Jan. 3, 2019

(51) Int. Cl.
 *G05D 1/02* (2020.01)
 *G06F 9/48* (2006.01)
 *G05D 1/00* (2006.01)
 *G06F 9/54* (2006.01)
 (Continued)

(52) U.S. Cl.
 CPC ......... *G05D 1/0212* (2013.01); *G05D 1/0088* (2013.01); *G06F 9/4831* (2013.01); *G06F 9/542* (2013.01); *G06F 13/26* (2013.01); *G06Q 10/00* (2013.01); *G05D 2201/0213* (2013.01)

(58) Field of Classification Search
 CPC ........ G06F 9/4831; G06F 9/542; G06F 13/26; G05D 1/0088; G05D 2201/0213; G05D 1/0212
 See application file for complete search history.

(56) References Cited

U.S. PATENT DOCUMENTS

| | | | |
|---|---|---|---|
| 8,412,449 B2 | 4/2013 | Trepagnier et al. | |
| 2002/0133325 A1* | 9/2002 | Hoare, II | G06F 17/5009 |
| | | | 703/17 |
| 2005/0246716 A1 | 11/2005 | Smith et al. | |

(Continued)

OTHER PUBLICATIONS

Notice of Allowance dated Dec. 16, 2019 for U.S. Appl. No. 15/640,917.

(Continued)

*Primary Examiner* — Jacob D Dascomb
(74) *Attorney, Agent, or Firm* — Womble Bond Dickinson (US) LLP

(57) ABSTRACT

An event queue is maintained to store IO events generated from a number of sensors and timer events generated for a number of autonomous driving modules. For each of the events pending in the event queue, in response to determining that the event is an IO event, the data associated with the IO event is stored in a data structure associated with the sensor in a global store. In response to determining that the event is a timer event, a worker thread associated with the timer event is launched. The worker thread executes one of the autonomous driving modules triggered or initiated the timer event. Input data is retrieved from the global store and provided to the worker thread to allow the worker thread to process the input data.

18 Claims, 12 Drawing Sheets

(51) Int. Cl.
*G06F 13/26* (2006.01)
*G06Q 10/00* (2012.01)

(56) References Cited

U.S. PATENT DOCUMENTS

| | | |
|---|---|---|
| 2007/0011415 A1 | 1/2007 | Kaakani et al. |
| 2007/0011660 A1 | 1/2007 | Garyali et al. |
| 2008/0098207 A1 | 4/2008 | Reid et al. |
| 2012/0197477 A1 | 8/2012 | Colwell |
| 2012/0221955 A1 | 8/2012 | Raleigh et al. |
| 2012/0254876 A1* | 10/2012 | Bishop .................... G06F 9/542 718/102 |
| 2012/0316725 A1 | 12/2012 | Trepagnier et al. |
| 2013/0232402 A1* | 9/2013 | Lu .......................... G06F 9/542 715/234 |
| 2013/0273968 A1 | 10/2013 | Rhoads et al. |
| 2014/0304505 A1 | 10/2014 | Dawson |
| 2015/0095190 A1 | 4/2015 | Hammad et al. |
| 2016/0048556 A1 | 2/2016 | Kelly et al. |
| 2016/0062954 A1 | 3/2016 | Ruff et al. |
| 2016/0162406 A1 | 6/2016 | Latorre et al. |
| 2016/0294921 A1 | 10/2016 | Meng et al. |
| 2017/0016733 A1 | 1/2017 | Rolf |
| 2017/0075358 A1 | 3/2017 | Zhang |
| 2017/0169208 A1 | 6/2017 | Jantz et al. |
| 2017/0253181 A1* | 9/2017 | Choi ....................... B60Q 9/008 |
| 2018/0292829 A1 | 10/2018 | Li |
| 2018/0336007 A1 | 11/2018 | Li |

OTHER PUBLICATIONS

Non-Final Office Action dated Nov. 18, 2019 for U.S. Appl. No. 15/640,875.

\* cited by examiner

CENTRALIZED SCHEDULING SYSTEM USING EVENT LOOP FOR OPERATING AUTONOMOUS DRIVING VEHICLES

RELATED APPLICATIONS

This application is related to co-pending U.S. patent application Ser. No. 15/640,875, entitled "Centralized Scheduling System for Operating Autonomous Driving Vehicles,", filed Jul. 3, 2017 and co-pending U.S. patent application Ser. No. 15/640,917, entitled "Centralized Scheduling System using Global Store for Operating Autonomous Driving Vehicles,", filed Jul. 3, 2017. The disclosure of the above applications is incorporated by reference herein in its entirety.

TECHNICAL FIELD

Embodiments of the present disclosure relate generally to operating autonomous vehicles. More particularly, embodiments of the disclosure relate to scheduling tasks for autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Most of autonomous driving vehicles (ADVs) are controlled using autonomous driving modules hosted by an operating system such as a robotic operating system (ROS). Existing robotics approach based autonomous driving systems are implemented using a revised robotics operating system that suffers from a variety of deficiencies including difficult to deploy, difficult to be used in debugging, and output inconsistent results for different operations on the same input. A robotics based system requires modifying some kernel level code of the operating system to guarantee that it is running in real time.

An autonomous driving system consists of several modules communicating with each other frequently. Thus, how to coordinate and orchestrate the interaction among different modules becomes a core problem of designing an efficient and robust autonomous driving system. The existing solution is mostly decentralized (meaning that each module runs as a long running process), and employs a publisher-subscriber model of message passing. The multi-process model of modules shares all the resources underneath and may suffer from a race condition for limited resources. Under a multi-process environment, messages are transmitted using a publication/subscription channel over a network. In practice, this approach added input/output (IO) overhead to the system and is a major source of inconsistency of system behaviors.

Modules are independent and keep running in one process forever, which makes failover hard to implement. By its nature, each module resides in its own process space and keeps many of its own states, which makes it impossible to recover when anything wrong happens within the module. As a result, the decentralized and distributed system architecture cannot enjoy the advantage of robustness such a system usually has. Even worse, each module in this system could potentially become a single point of failure, which is lethal to an autonomous driving system.

An existing robotics-based autonomous driving system utilizes a decentralized method for data storage and communication. It requires copying result data from one module to another, which may increase the delay. The communication protocol to transmit data, like TCP/IP, may create redundant packet head, which is also inefficient. The existing system adds a lock on data storage since it is written and read via multiple threads. This might result in a deadlock, which requires extra methods to handle. As a result, the existing system is not able to provide consistent outputs with the same input since there is no time bound the communications. Delay of communication will result in inconsistent results.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
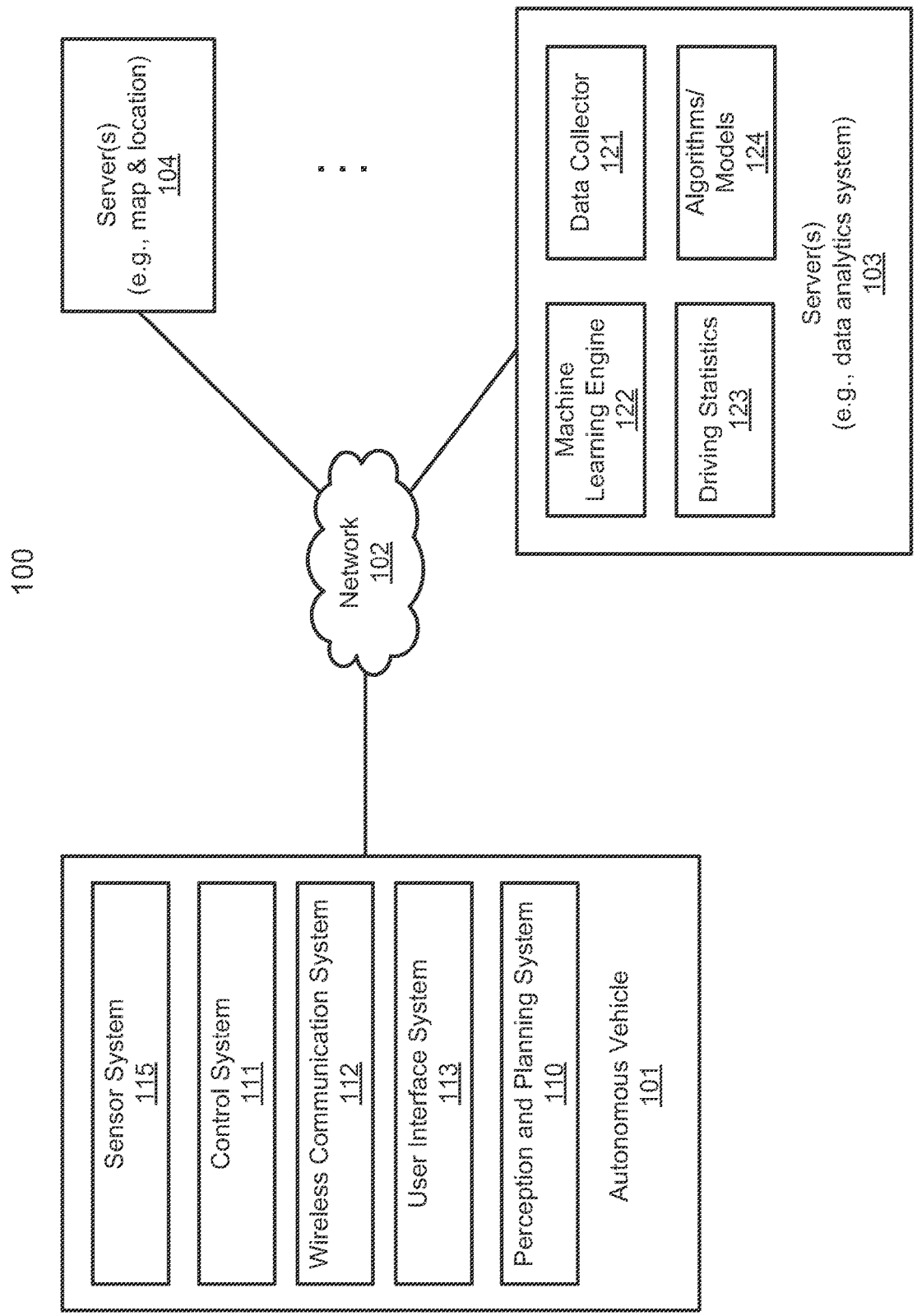
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect of the disclosure, a centralized scheduling based autonomous driving system is utilized to solve at least some of the above deficiencies. The centralized scheduling system is a single threaded system to manage multiple autonomous driving modules (e.g., perception module, prediction module, decision module, planning module, or control module). With the single threaded system, it will be much easier to debug from any time and any internal state of the system. It generates consistent results for different runs on the same input. The system is using centralized scheduling with a single clock to ensure atomic operations of the system. As a result, the system can process the input and generate the results in the same logical order during different runs. The executable code of the system lives purely in a user mode or user space such that there is no kernel level modification, which may cause some unpredictable results. The system is independent to the operating systems and third-party libraries such that it can be portable to different autonomous platforms easily.

In one embodiment, an autonomous driving system includes a number of sensors (e.g., cameras, LIDAR, radar, IMU, GPS, etc.) and a number of autonomous driving modules (e.g., perception module, prediction module, decision module, planning module, or control module, etc.). The autonomous driving system further includes a global store to store data generated and used by processing modules such as sensors and/or autonomous driving modules, as well as internal states of the system. The autonomous driving system further includes a task scheduler coupled to the sensors, the autonomous driving modules, and the global store. In response to output data generated by any one or more of processing modules such as sensors and the autonomous driving modules, the task scheduler stores the output data in the global store. In response to a request from any of the processing modules for processing data, the task scheduler provides input data stored in the global store (also referred to as a global state store, a global storage, a global state storage) to the processing module. The task scheduler is executed in a single thread that is solely responsible for managing data stored in the global store and dispatching tasks to be performed by the processing modules. All processing modules have to go through the task scheduler in order to access the global store.

According to another aspect of the disclosure, an event loop based centralized scheduler is utilized for an autonomous driving system. The event loop is a single-threaded process, which may be implemented as a part of the task scheduler. Access/update to resource and global store are all via the event loop, where the global store is lock-free by its nature. The event loop is usually launched or awakened by an event such as an IO event or a timer event. This non-blocking IO model is highly efficient and avoids waiting on time consuming IO operations. Instead of long running processes, processing modules are series of independent tasks. Moreover, these tasks are stateless. Thus, fail-over is easy to implement by just restarting the module. All the modules are consolidated into a sequence of processes scheduled by the event loop, which is clean, easy to test and deploy. By having an event loop based scheduler one can have the chance to make core logic decoupled from IO communication, and IO just becomes one of the triggers of the modules.

According to one embodiment, an event queue is maintained to store IO events generated from a number of sensors and timer events generated for a number of autonomous driving modules. For each of the events pending in the event queue, in response to determining that the event is an IO event, the data associated with the IO event is stored in a data structure associated with the sensor in a global store. In response to determining that the event is a timer event, a worker thread associated with the timer event is launched. The worker thread executes one of the autonomous driving modules triggered or initiated the timer event. Alternatively, a worker thread may be launched or awaken in response to an IO event (e.g., an IO event indicating that point cloud data or GPS data becomes available). Input data is retrieved from the global store and provided to the worker thread to allow the worker thread to process the input data. The above operations are iteratively performed via a single thread that accesses the event queue and the global store for all of the pending events stored in the event queue.

According to another aspect of the disclosure, a data system, referred to as a global store, is utilized for information storage and communication in autonomous driving vehicles. The global store can only be accessed by a single thread from a task scheduler so that no lock is needed, which avoids deadlock fundamentally. Instead of copying data, the task scheduler only passes pointers of data to the autonomous driving modules so that the communication delay is low and there is no redundant packet head from the communication protocols such as TCP/IP. Data is stored in the order of time stamp. As a result, a simulator can provide consistent outputs with the same input, which leads to the convenience of re-producing the potential problems. The global store has a garbage collection mechanism to control the memory usage by archiving older data in an archiving device. It is easy to monitor the current global since all the newest updates are collected in the global store.

According to one embodiment, a global store is maintained to store a number of data structures (e.g., linked lists). Each data structure includes a number of entries and each entry stores data of one of the events in a chronological order. Each data structure is associated with one of the sensors or the autonomous driving modules of an autonomous driving vehicle. When a first event associated with a first autonomous driving module is received, where the first event includes a first topic ID, the first topic ID is hashed to identify one or more first data structures corresponding to the first event. Pointers (e.g., a memory pointer) pointing to heads of the first data structures are passed to the first autonomous driving module to allow the first autonomous driving module to process data associated with the first event. Since the pointers of the first data structures are passed to the first autonomous driving module, there is no need to copy the data of the first data structures. Instead, the first autonomous driving module can directly access the data via the pointers.

When a notification is received from the first autonomous driving module indicating that the data of the first event has been processed, one or more second data structures stored in the global store are identified, where the second data structures are associated with the first autonomous driving module. The second data structures may be configured to store output data of the first autonomous driving module. A result of processing the data of the first event is then pushed onto the head of the second data structures. When a second event associated with a first sensor is received, a second topic ID associated with the second event is hashed to identify a third data structure. Data is then obtained from the second event and pushed onto a head of the third data structure, including a timestamp of the third event.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
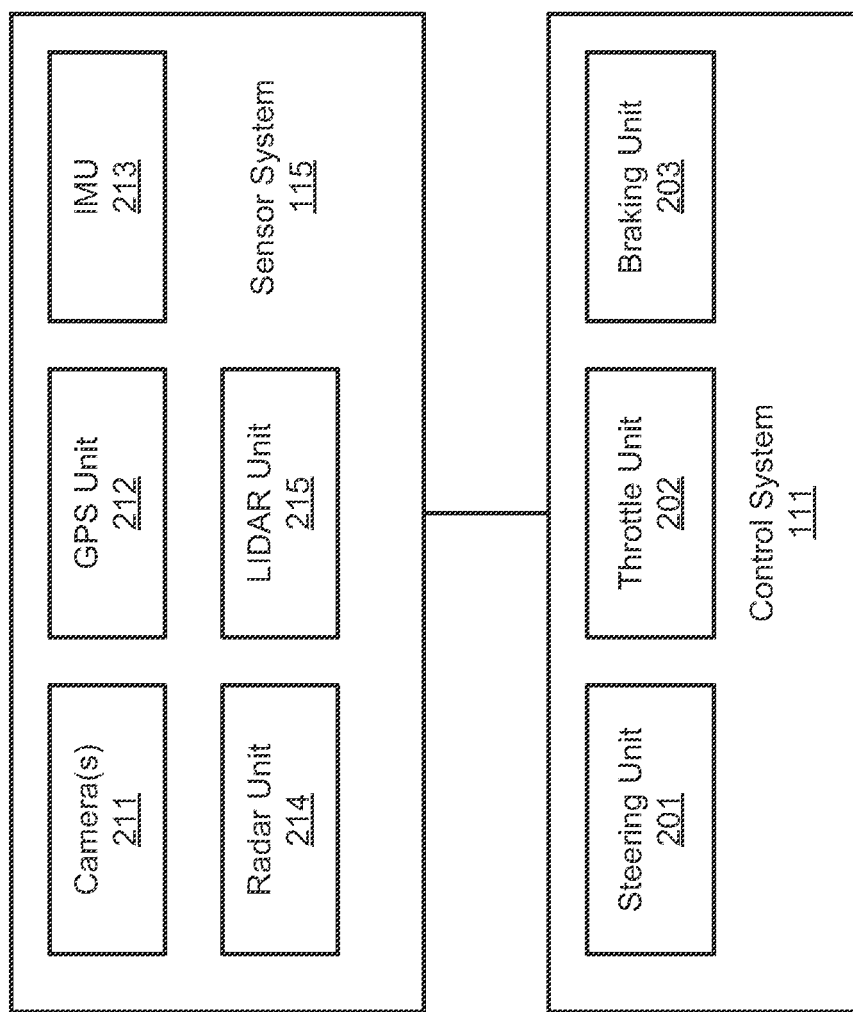
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Based on driving statistics 123, machine learning engine 122 generates or trains a set of rules, algorithms, and/or predictive models 124 for a variety of purposes. Rules 124 may include rules to recognize and conceive objects in a driving environment surrounding an ADV. Rules 124 may include rules to plan and control the ADV, etc.

Figure 3:
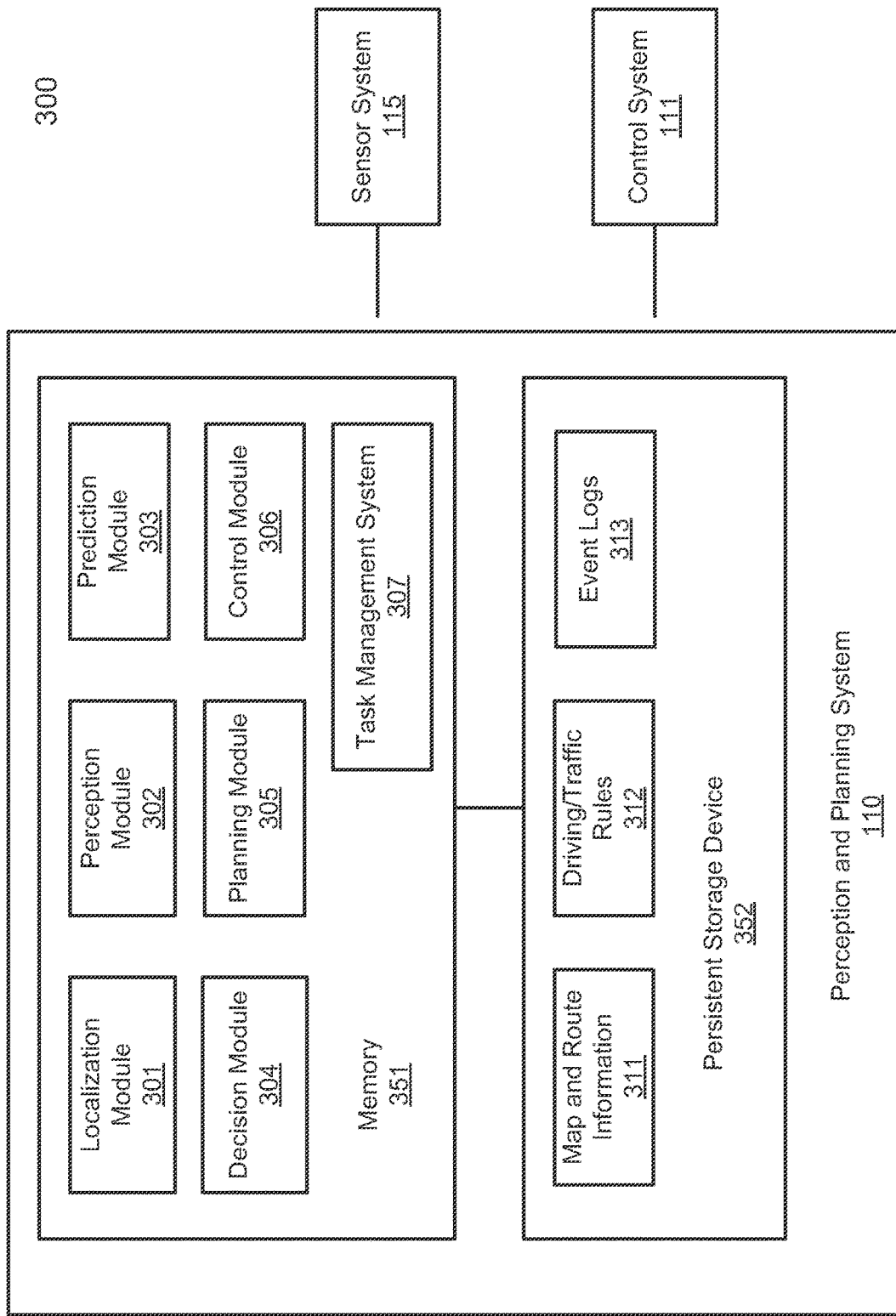
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, and task management system 307. Modules 301-306, as well as other components or modules that are involved to drive an ADV, are referred to as autonomous driving modules (ADMs).

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Figure 4:
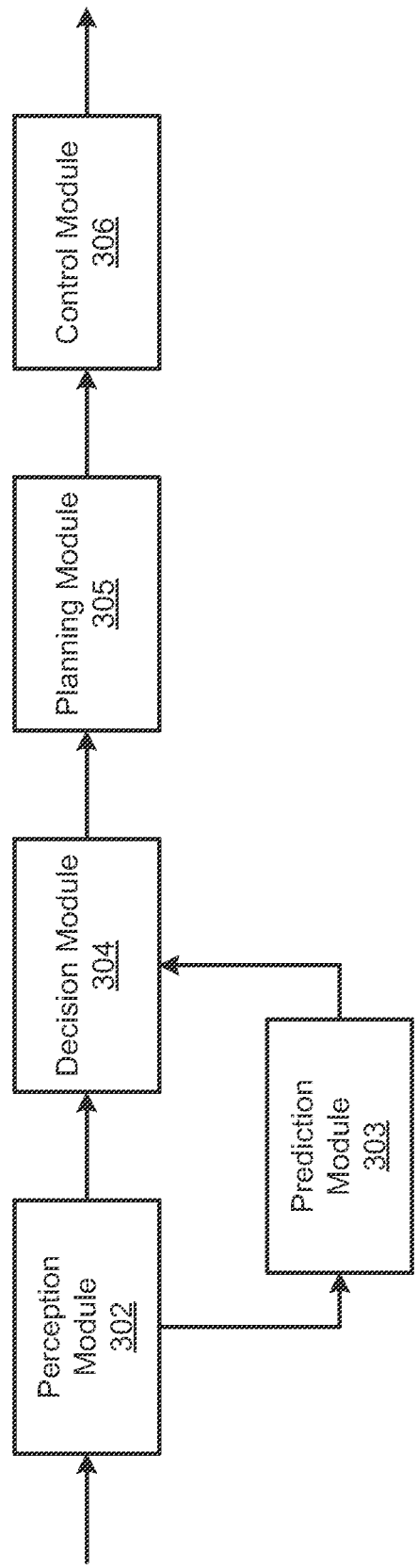
FIG. 4 is a diagram illustrating a processing flow of operating an autonomous driving vehicle according to one embodiment.

Referring now to FIG. 3 and FIG. 4, localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects perceived by perception module 302 and potential movement of the objects predicted by prediction module 303, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, task management system 307 is configured to communicate with any of the processing modules, such as modules 301-306 and sensors of sensor system 115, as well as other modules involved to drive the ADV, to dispatch and coordinate tasks to be performed by the processing modules. Each of the tasks performed by modules 301-306 and sensor system 115 is scheduled and coordinated by task management system 307 in an efficient way. According to one embodiment, task management system 307 is a single threaded system to manage and/or coordinate operations of the processing modules. With the single threaded system, it will be much easier to debug from any time and any internal state of the system. It generates consistent results for different runs on the same input. The system is using centralized scheduling with a single clock to ensure atomic operations of the system. As a result, the system will process the input and output the results in the same logical order during different runs. The executable code of the system lives purely in a user space such that there is no kernel level modification required, which may cause some unpredictable results. The system is independent to the operating systems and third-party libraries such that it can be portable to different autonomous vehicles easily.

Figure 5:
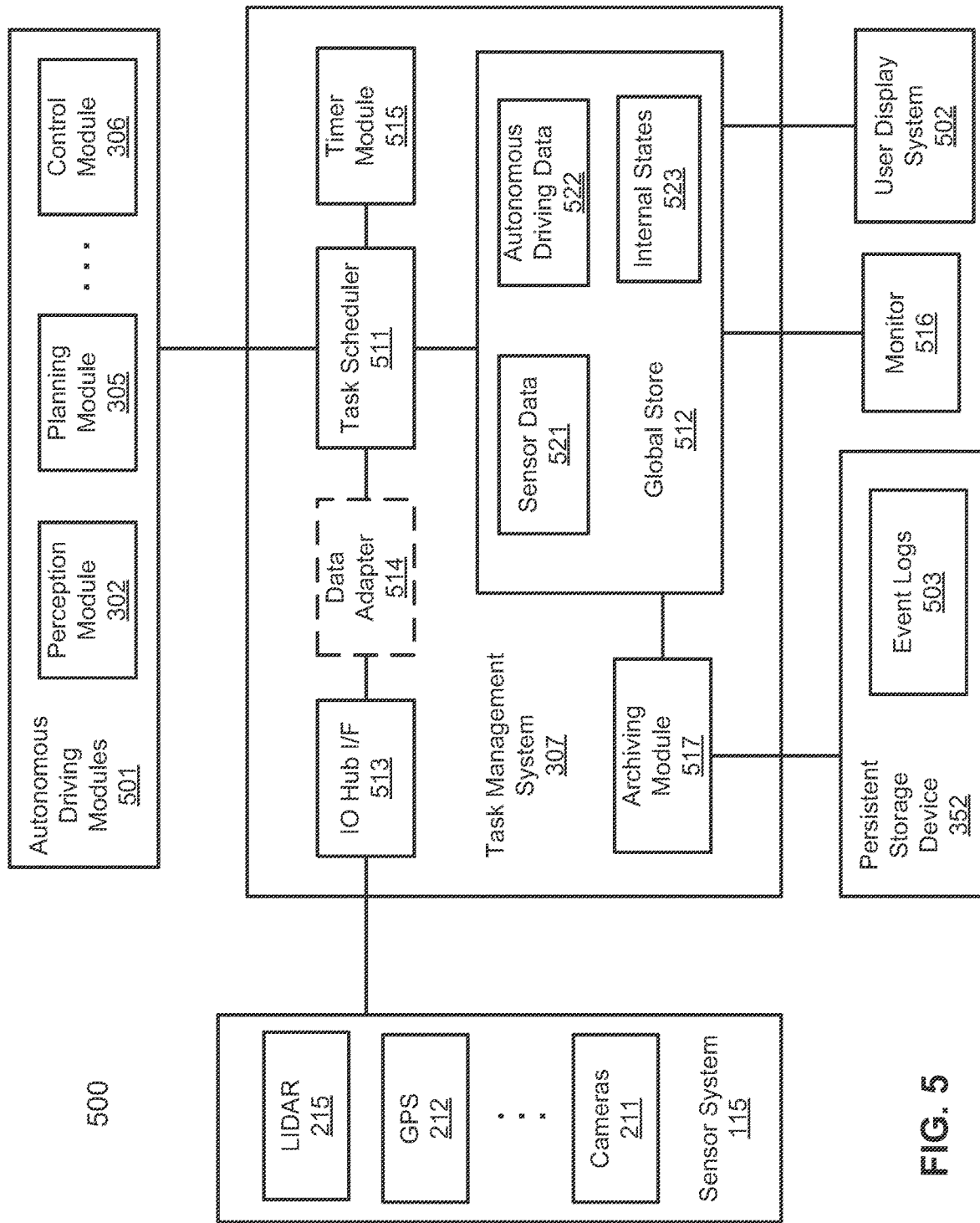
FIG. 5 is a block diagram illustrating an example of a task management system according to one embodiment.

FIG. 5 is a block diagram illustrating an example of a task management system according to one embodiment. System 500 may be implemented as a part of system 300 of FIG. 3. Referring to FIG. 5, system 500 includes task management system 307 communicatively coupled to autonomous driving modules 501 and sensor system 115, as well as other components or modules (e.g., monitor 316, user display system 502). Autonomous driving modules 501 may include any of the components involved to drive the ADV, such as, localization module 301, perception module 302, prediction module 303, decision module 304, planning module 305, and control module 306. In one embodiment, task management system 307 includes, but is not limited to, task scheduler 511, global store 512, IO hub interface module 513, data adaptor 514, timer module 515, and archiving module 517. Task scheduler 511 is a centralized scheduler that centrally manages communications amongst all parties, such as sensor system 115 and autonomous driving modules 501. In one embodiment, task scheduler 511 is executed as a single threaded process that is exclusively responsible for managing data stored in global store 512. Other parties, such as sensor system 115 and autonomous driving modules 501, have to go through task scheduler 511 in order to access global store 512.

Task scheduler 511 is a core part of the task management system 307. Every time when a task is triggered to be performed, a corresponding worker thread is launched or woke up to process associated task. After the worker thread finishes the task, either successful or failed, the worker thread notifies task scheduler 511 to write any result (if there is any) to global store 512. Task scheduler 511 is in charge of handling the triggered tasks and executing them using worker threads. A task can be storing sensor data produced by any of the sensors in sensor system 115. Alternatively, a task can be processing sensor data (e.g., LIDAR data) produced by one or more sensors by an autonomous driving module (e.g., perception module 302). Further, a task can be processing, by an autonomous driving module (e.g., decision module 304), output data produced by one or more other autonomous driving modules (e.g., perception module 302) and output data produced by one or more sensors.

IO hub interface module 513 is responsible for interfacing IO devices, in this example, sensors of sensor system 115, with task scheduler 511. IO hub interface module 513 is used to handle all the input data from sensors of an ADV. It continuously processes the raw sensor data and requests task scheduler 511 to write the processed sensor data into global store 512 to be utilized as input data for other tasks. IO hub interface module 513 may include one or more sensor drivers corresponding to sensors of sensor system 115. Each of the sensors of sensor system 115 may be associated with a specific sensor driver to communicate with the sensor (e.g., hardware such as registers of the sensor) including reading and/or processing sensor data from the sensor. Data adapter 514 is an optional data conversion module to convert a specific format of sensor data to a predetermined or unified data format that is suitable to be stored in global store 512 and recognizable by other related parties such as autonomous driving modules 501. With the optional data adaptor 514, a third party sensor and/or a third-party sensor driver with a proprietary component or format can be utilized.

According to one embodiment, when any of sensors of sensor system 115 senses and produces sensor data, a corresponding sensor driver obtains the sensor data from the sensor and communicates with task scheduler 511. In one embodiment, the sensor driver triggers an IO event, for example, through an interrupt or via an application programming interface (API), to notify task scheduler 511 indicating that there is new sensor data available for processing. In response to the IO event, task scheduler 511 retrieves the sensor data through the IO event and stores the sensor data in a data structure stored in global store 512 as a part of sensor data 521. In addition, after storing the sensor data in global store 512, according to one embodiment, task scheduler 511 may launch or wake up a worker thread of a processing module (e.g., perception module 302) to process the newly received sensor data. Task scheduler 511 is configured to identify a particular processing module to process the sensor data based on a type of sensor data.

The data structure is specifically configured to store the sensor data for that particular sensor. That is global store 512 may include a number of data structures for storing sensor data for sensors of sensor system 115, each data structure corresponding to one or more of the sensors of sensor system 115. Task scheduler 511 handles the IO events one at a time via a single threaded process. All IO events may be handled according to a chronological order such as a first-come-first-served manner. Alternatively, the IO events may be handled according to priorities of the IO events, where different types of IO events may be associated with different priorities. As a result, the race condition for resource contention in a conventional system can be avoided.

According to one embodiment, for at least some of the autonomous driving modules 501, timer module or timer logic 515 periodically generates one or more timer events that will lapse within a predetermined period of time, such as 100 milliseconds. When a timer event associated with a particular autonomous driving module lapses, a worker thread hosting the autonomous driving module is launched or woke up to process data. In one embodiment, in response to a timer event, task scheduler 511 examines the timer event to identify one of the corresponding autonomous driving modules associated with the timer event. That is, the timer event may include certain information identifying the corresponding autonomous driving module such as a module ID of the autonomous driving module.

In addition, according to one embodiment, the timer event may further identify the input data that will be processed by the autonomous driving module. For example, the timer event may indicate that a particular autonomous driving module (e.g., perception module) needs to process the point cloud data produced by LIDAR device 215. As a result, task scheduler 511 identifies a data structure of global store 512 that stores the sensor data produced by LIDAR device 215. Task scheduler 511 then launches or wakes up a worker thread that executes the corresponding autonomous driving module and passes a pointer of the identified data structure as an input to the autonomous driving module. The autonomous driving module then can process the data stored in the data structure via the pointer passed from task scheduler 511 without having to copy the data, which tends to be slow and resource consuming. The results of the autonomous driving module are stored back as a part of autonomous driving data 522 in global store 512.

The global store 512 is used to store all the information used in the autonomous driving system, including the processed raw data from the sensors (e.g., sensor data 521), the internal state 523 of the system, and the results of the tasks (e.g., autonomous driving data 522). The global store 512 is lock free to accelerate operations of the whole system and it periodically dumps out-of-date data into a persistent storage as logs for disaster back-ups, debugging and system improving etc.

Monitor 516 is an optional monitoring system configured to record the states of the system and send alerts to the appropriate parties when it detects certain abnormal behaviors to keep the safety of the autonomous driving. Global store 512 can be read by other components such as user display system 502. User display system 502 is used to show necessary information of the autonomous driving system in order to for user to understand the operating states of the ADV. At least some of the data stored in global store 512 can be archived to persistent storage device 352 as a part of event logs 503. The system may further include a grading system configured to evaluate the performance of the autonomous driving system in view of several metrics, such as no collisions, obeys traffic rules, reaching destination, and ride experience, etc. The evaluation results may be used to improve the whole autonomous driving system as feedbacks. The system may further include an agent system configured to generate some virtual agents, such as static objects, moving objects (e.g., vehicles, pedestrians), etc. to simulate some scenarios during the system development.

Note that the memory space of global store 512 may be maintained in a limited space. Thus, periodically, archiving module 517 (e.g., a garbage collection module) may archive any data that is unlikely used in global store 512 into persistent storage device 352 as a part of event logs 503. As a result, the memory space of the archived data can be released and/or reused. In one embodiment, any data older than a predetermined time threshold with respect to a current system time may be removed from global store 512 and stored in persistent storage device 352 as a part of event logs 503. The time threshold for archiving may be user configurable dependent upon the available system resources of the system (e.g., an amount of memory available to host global store 512). Archiving module 317 can compare a timestamp of each event entry against a current system time to determine whether that particular event entry should be archived.

Figure 6:
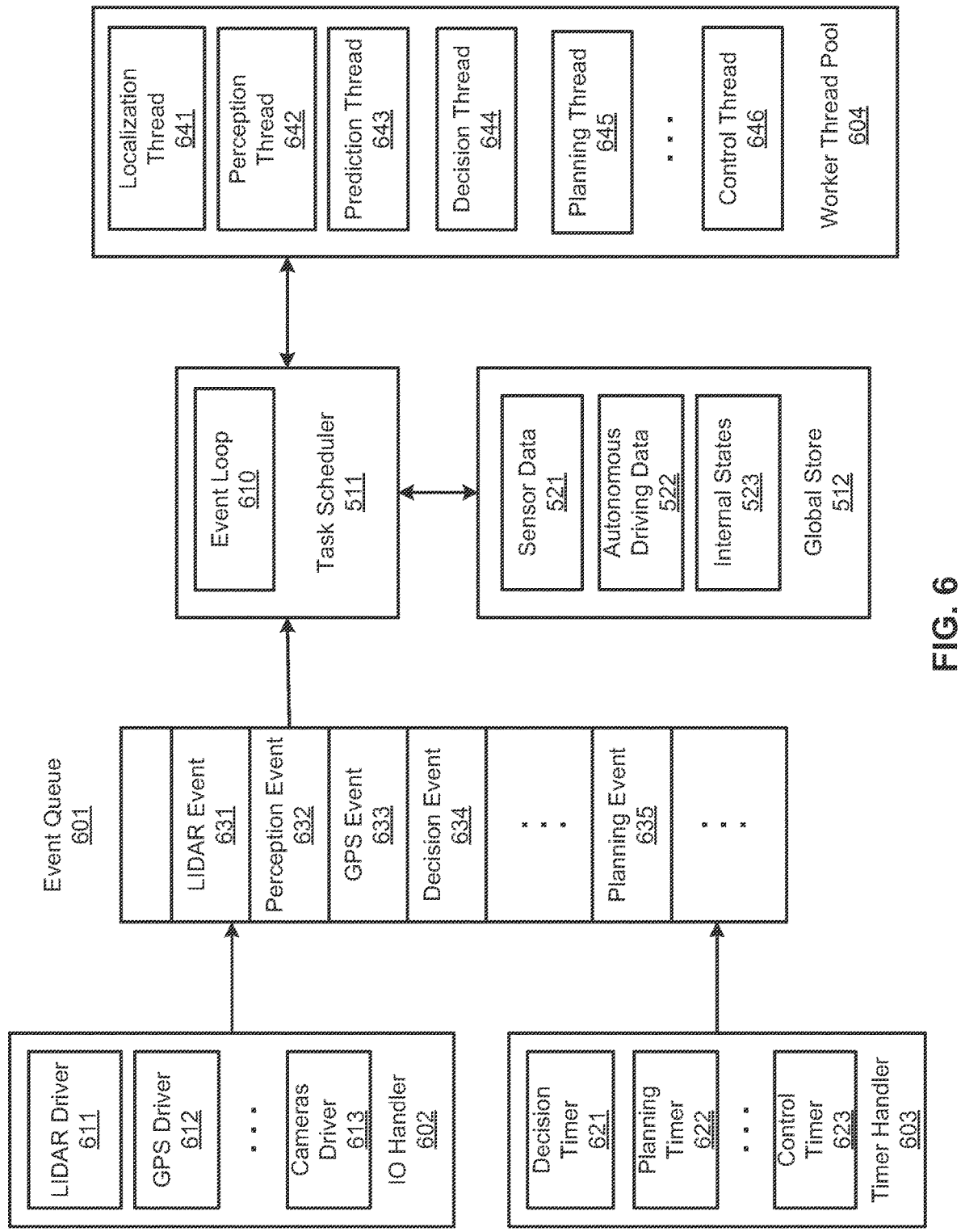
FIG. 6 is a block diagram illustrating an example of a task management system according to another embodiment.

FIG. 6 is a block diagram illustrating an example of a task management system according to another embodiment. Referring to FIG. 6, system 600 includes an event queue 601 to store and buffer pending events that are generated from IO handler 602 and timer handler 603. IO handler 602 may be implemented as a part of IO hub interface 513 and timer handler 603 may be implemented as a apart of timer module 515. In one embodiment, task scheduler 511 includes an event loop module 610. Event loop module 610 is executed as a single threaded process. Access and updates to system resources and global store 512 are all via event loop module 610, which is a lock-free by nature. Event loop module 610 is usually awaken by an IO event triggered by IO handler 602 or a timer event triggered by timer handler 603. This non-blocking IO model is highly efficient and avoids waiting on time consuming IO operations as found in conventional systems.

Instead of long running processes, modules (e.g., autonomous driving modules, user display system, monitor) are implemented as series of independent tasks carried by respective worker threads, which may be maintained as a part of worker thread pool 604. The tasks are stateless processes and executed by respective threads asynchronously and independently. Thus, fail-over can be easily implemented, for example, by simply restarting the modules. All of the modules are launched or awakened by event loop module 610 in series, one at a time, which is clean and easy to test and deploy. By having an event loop based scheduler, the core scheduling logic can be decoupled from the IO communication and the IO just becomes one of the triggering logic of the modules.

Global store 512 contains a number of event data structures. Each event data structure corresponds to one of the parties involved herein, such as, for example, sensors of sensor system 115 and processing modules (e.g., autonomous driving modules 501, user display system 502, monitor 516, and archiving module 517). Each event data structure includes a number of event entries and each event entry stores event data of a particular event, including a timestamp of the event and data associated with the event (e.g., data generated by a corresponding party or component). An event data structure may be implemented in a variety of manners, such as, for example, an array, a circular buffer, a linked list, a table, a database, etc.

In one embodiment, worker thread pool 604 contains a pool of worker threads that are ready to perform tasks. A task is performed by an executable code of a module executed by the corresponding worker thread. Once the task is completed, the worker thread will notify event loop module 610 via a callback interface. The notification may further includes a result or status of the task. In response to the notification, event loop module 610 writes the result or status as an entry into a data structure corresponding to the module that initiated the callback in global store 512. Alternatively, event loop module 610 may write the result into one or more data structures, which may be preconfigured or specified by the notification.

IO handler 602 communicates with sensors of sensor system 115, where IO handler 602 may include one or more sensor drivers 611-613 that specifically handle communications with the corresponding sensors. When a sensor captures sensor data, a corresponding sensor driver of IO handler 602 obtains the sensor data, optionally invokes a data adaptor to convert the format of the sensor data, and transmits the sensor data to task scheduler 511 to be written into a data structure associated with the sensor in global store 512. In one embodiment, in response to sensor data produced by a sensor, a sensor driver associated with the sensor generates an IO event, for example, via an interrupt or a call to a predetermined API. IO handler 602 pushes the IO event into a tail of event queue 601. Once the IO event has been pushed into the tail of event queue 601, event loop module 610 may be notified or awakened. In addition, for certain type of sensor data (e.g., point cloud data generated from LIDAR device 215), after storing the sensor data in global store 512, event loop 610 may launch or wake up a processing module that is configured to process the sensor data, such as perception module 302. In this scenario, a worker thread of an autonomous driving module is launched or awaken in response to an IO event.

Timer handler 603 is configured to handle timer events for processing modules, such as autonomous driving modules 501, user display system 502, monitor 516, and archiving module 517, etc. Timer handler 603 may include timer logic 621-623 configured to specifically generate timer events for the corresponding processing modules. In one embodiment, for each of the processing modules, timer handler 603 periodically generates at least one timer event. The timer event may be inserted or pushed into a tail of event queue 610. A timer event may be triggered for every predetermined period of time such as 100 milliseconds. The periodic time period for a timer event may be the same or different for different processing modules. Multiple timer events may be generated for a single processing module. For example, as shown in FIG. 4, decision module 304 may require input data from perception module 302 and prediction module 303. In this example, a first timer event may be generated for decision module 304 indicating that the first timer event requires an input of data generated from perception module 302. A second timer event may be generated for decision module 304 indicating that the second timer event requires an input of data generated from prediction module 303. Alternatively, a single timer event may be generated specifying that data of both perception module 302 and prediction module 303 are required. The IO events and the timer events are chronologically pushed into the tail of event queue 601 as a part of pending events 631-635.

In one embodiment, event loop module 610 periodically (e.g., via an internal clock, or notified by an event) loops through event queue 601 to determine whether there is any event pending to be processed. If it is determined there is at least one event pending in event queue 601, event loop module 610 pops or removes a top event from a head of event queue 601. As described above, when a new event is generated, the new event is pushed into the tail of event queue 601, while event loop module 610 processes the events from the head of event queue 601. Thus, the events are processed in a first-in-first-out (FIFO) or first-come-first-served manner, i.e., a chronological order from the oldest event to the newest event.

In response to an event retrieved from the head of event queue 601, event loop module 610 examines event data of the event to determine an owner of the event, as well as required input data of the event. As described above, an event can be an IO event generated by IO handler 602 or a timer event generated by a timer handler 603. All of the IO events and timer events may be pushed into the tail of event queue 601 according to a first-come-first-served manner. Alternatively, event queue 601 may include a first specific event queue for IO events and a second specific event queue for timer events. Further, if certain events have different priorities, multiple event queues, each being associated with a different priority, may be maintained and utilized for prioritized task dispatches.

In one embodiment, in response to an IO event popped from the head of event queue 601, event loop 610 examines event data of the IO event to identify an owner of the IO event. An IO event may be triggered by an owner representing any of the sensors of sensor system 115. Once the owner of the IO event has been identified, an event data structure associated with the owner is identified. Event data of the IO event is then stored in the identified event data structure.

Figure 7:
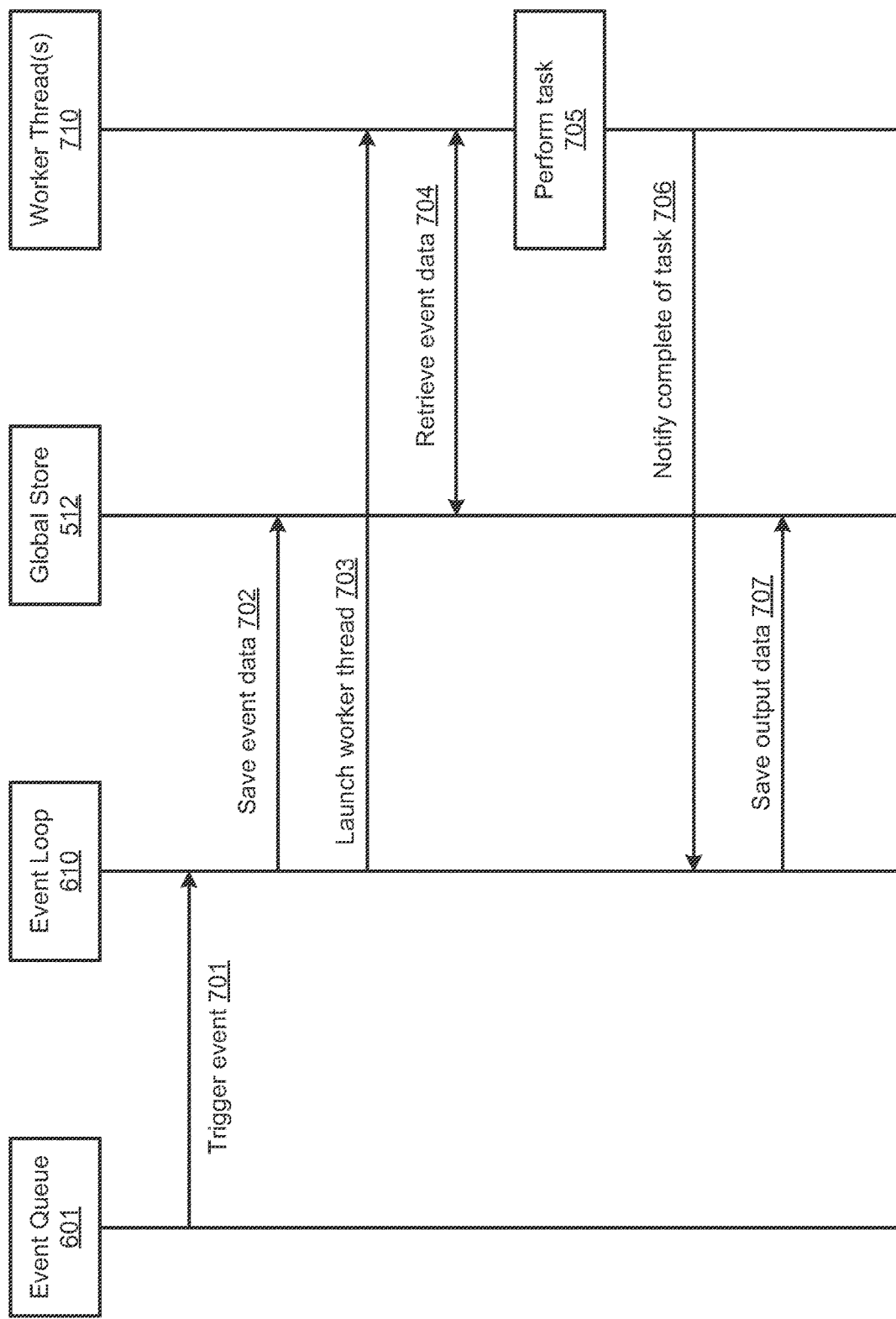
FIG. 7 is a flow diagram illustrating an example of a processing flow of a task management system according to one embodiment.

In one embodiment, referring to FIG. 6 and FIG. 7, in response to a timer event popped from the head of event queue 601 via path 701, event loop module 610 examines event data of the timer event to identify an owner of the timer event, as well as input data required by the timer event. Optionally if the event data has not been stored, event loop module 610 stores the event data in global store 512 via path 702. For example, a timer event may be generated for decision module 304 to process perception data generated by perception module 302. The timer event in this situation will specify that an owner of the timer event is decision module 304 and the required input data includes perception data produced by perception module 302.

In response the event, event loop module 610 allocates, launches, and/or wakes up worker thread 710 from worker thread pool 604 that corresponds to the event via path 703. Worker thread pool 604 includes a number of worker threads 641-646, one for each of the processing modules that process data stored in global store 512. For example, perception thread is the worker thread configured to execute an executable code image of perception module 302. If the worker thread has already been allocated and launched, event loop module 610 simply wakes up the worker thread. For example, if the event belongs to decision module 304, event loop module 610 launches or wakes up a decision thread. In addition, event loop module 610 passes a memory pointer pointing to a memory location storing a data structure of global store 512 that stores the required input data to the worker thread. Worker thread 710 can directly retrieve (e.g., in a read-only manner) the input data from the data structure via the memory pointer via path 704, without having to copy the input data. In the above example of decision module 304 processing perception data of perception module 302, event loop module 610 would pass the pointer of a data structure storing perception data for perception module 302 to a worker thread associated with decision module 304. Note that if a processing module requires input data from multiple data structures, which may be indicated based on the event, pointers of the data structures are then passed to the processing module.

In operation 705, worker thread 710 processes the input data. Once the input data has been processed, worker thread 710 notifies event loop module 610 via path 706, for example, using a callback mechanism. The notification may include a result of processing the input data or a status of the processing (e.g., success or failure). In response to the notification, event loop module 610 stores the result and/or status of worker thread 710 in global store 512. In one embodiment, in response to the notification from worker thread 710, event loop module 610 identifies a data structure that stores results for worker thread 710 in global store 512. Typically, the data structure is associated with a processing module executed or hosted by worker thread 710. In the above example of decision module 304 processing perception data of perception module 302, event loop module 610 would identify a data structure corresponding to decision module 304 and store the result of worker thread 710 in the data structure of decision module 304 in global store 512.

Thus, in this configuration, the output data of a first processing module may be utilized as input data of a second processing module. Since all data produced by all relevant processing modules are all stored in appropriate data structures and the pointers of the data structures are passed onto a next processing module, which are all managed by event loop module 610 executed in a single processing thread, there is no need of copying data during the processes. Note that a worker thread may process input data stored in multiple data structures of global store 512. Similarly, a work thread may generate output data to be stored in multiple data structures in global store 512. For example, referring back to FIG. 4, the output data produced by decision module 304 may be stored in global store 512. The output data of decision module 304 may be retrieved from global store 512 and utilized as input data by planning module 305 subsequently. The output data of planning module 305 may be stored in global store 512 and subsequently utilized as input data for control module 306, etc.

Figure 8:
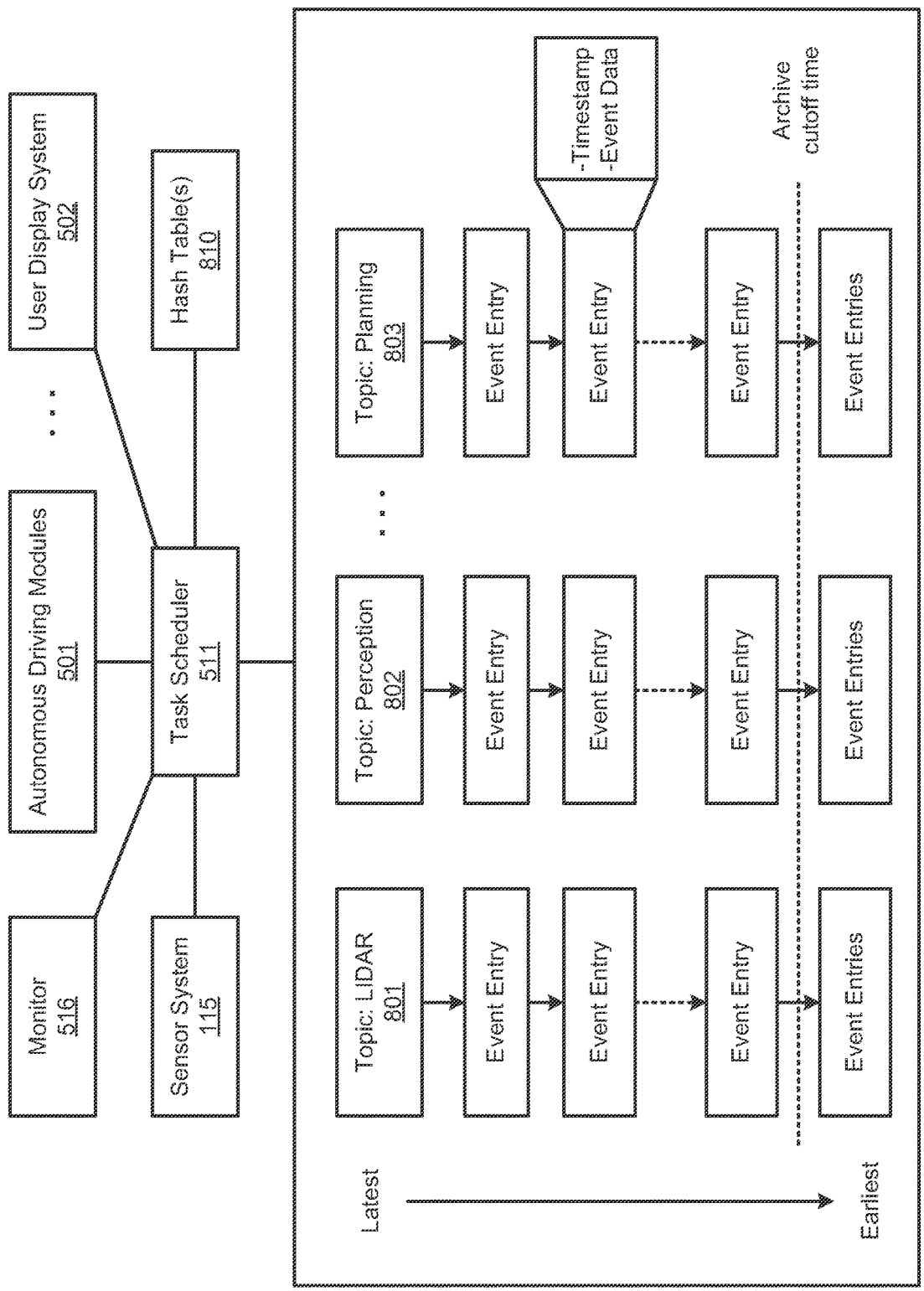
FIG. 8 is a block diagram illustrating an example of a task management system according to another embodiment.

FIG. 8 is a block diagram illustrating an example of task management of an autonomous driving vehicle according to another embodiment. Referring to FIG. 8, global store 512 includes a number of data structures such as data structures 801-803. Each of the data structures is associated with a processing module to store output data generated by the corresponding processing module. A processing module can be any one of sensors in sensor system 115 and any one of autonomous driving modules 501. As described above, communications amongst the processing modules are performed by sharing data via global store 512.

In one embodiment, a message publication and subscription mechanism is utilized to manage the data shared by the processing modules. In this example, each of data structures 801-803 is configured to store a particular topic of messages produced by a particular publisher. A topic may include a unique identifier identifying a publisher. A publisher refers to a processing module that can produce output data, for example, in a form of messages stored in a data structure of the corresponding topic. For example, a topic can be "perception" that is associated with perception module 302. A data structure of a topic of "perception" is configured to store any output data generated by perception module 302, although perception module 302 may generate data to be stored in multiple data structures to be processed by multiple processing modules. Similarly, a data structure with a topic of "LIDAR" is configured to store sensor data produced by LIDAR device 215.

In one embodiment, each of data structures 801-803 includes a number of event entries (e.g., message entries) and each event entry stores event data of a particular event (e.g., a message). Each of data structures 801-803 may be implemented in a variety of formats, such as, for example, an array, a circular buffer, a linked list, a table, a database, etc. In this embodiment, data structures 801-803 are implemented as linked list data structures. A linked list is a linear collection of data elements, called nodes, each pointing to the next node by means of a pointer. It is a data structure consisting of a group of nodes which together represent a sequence. Under the simplest form, each node is composed of data and a reference (i.e., a link) to the next node in the sequence. A linked list structure allows for efficient insertion or removal of elements from any position in the sequence during iteration.

According to one embodiment, when an IO event is triggered from a sensor, task scheduler 511 determines a topic associated with the sensor as a publisher based on the IO event. The IO event may include an identifier as a topic identifying the sensor. Based on the identifier of the sensor, on of the data structures 801-803 is identified. Task scheduler 511 the pushes the event data into the head of the data structure. Note that the event may be buffered and stored in event queue 601 by IO handler 602 and task scheduler 511 is notified or periodically "walks" through the pending events in event queue 601. In response to a pending event in event queue 601, task scheduler 511 retrieves the event data from the event queue 601 and inserts the event data into the head of the data structure. For example, it is assumed data structure 801 is configured to store sensor data generated by LIDAR device 215. In response to an IO event triggered by LIDAR device 215, task scheduler 511 retrieves the event and its event data from the head of event queue 601. Based on the retrieved event, task scheduler 511 identifies data structure 801 that is associated with LIDAR device 215. Task scheduler 511 then inserts the event data into the head of data structure 801.

In one embodiment, task scheduler 511 maintains a hash table or hash data structure 810 as a quick lookup mechanism to determine which of data structures 801-803 is associated with a particular event. In response to a particular event, task scheduler 511 obtains a topic associated with the event, where the topic uniquely represents an event/message publisher or producer (e.g., LIDAR device 215, perception module 302). Task scheduler 511 hashes the topic using hash table 810 to produce a data structure identifier that identifies one of data structures 801-803. The output of the hash operation may include a pointer pointing to a memory location storing the identified data structure. The pointer may be a memory pointer pointing to the head of the data structure. Task scheduler 511 then inserts the event data of the event onto the head of the data structure.

According to one embodiment, in response to a timer event, which may be retrieved from the head of event queue 601, task scheduler 511 determines an owner of the timer event. An owner of an event refers to an event/message subscriber subscribing a particular topic published by an event/message publisher. An owner of an event can be any one of the processing modules that process sensor data produced by any of sensors of sensor system 115, such as, for example, autonomous driving modules 501, user display system 502, or monitor 516. In addition, task scheduler 511 determines input data required by the timer event. For example, an event identifier of an event may include information identifying both the owner of the event and the input data required by the event.

In one embodiment, task scheduler 511 hashes the event identifier using hash table 810 to identify a data structure storing the input data. The output of the hash operation reveals the data structure of the input data such as a pointer pointing to the head of the data structure. Task scheduler 511 then launches or wakes up a worker thread to execute a processing module associated with the owner of the timer event and passes the pointer of the data structure storing the input data to the worker thread. The worker thread can obtain input data via the pointer without having to copy the input data from global store 512, which is time and resource consuming. Note that an event may identify input data from multiple data structures. In such a scenario, pointers of the data structures are then passed to the worker thread.

For example, in response to a timer event, task scheduler 511 determines that the timer event is triggered for perception module 302 and the timer event requires sensor data (e.g., point cloud data) generated by LIDAR device 215. Task scheduler 511 launches or wakes up a worker thread executing an executable code of perception module 302 and passes the pointer of a data structure that stores the sensor data for LIDAR device 215, in the above example, the pointer of data structure 801, to the worker thread.

In one embodiment, the worker thread retrieves input data (e.g., IO event data) from the head of the data structure, where the data store at the head of the data structure is the newest data generated by an IO event. The rationale behind it is that autonomous driving modules are more interested to process the newest data since the newest data reflects the most current driving environment of the ADV. The autonomous driving decisions made on the newest data will be more accurate. Thus, data stored in data structures 801-803 are processed similar to a first-in-last-out (FILO) manner similar to a stack.

In one embodiment, each component as an event/message subscriber can only have read-only privilege to the data structures that are not owned by the component. A component can write data (e.g., output data) into its associated data structure or data structures, but it would have to go through task scheduler 511 as described above. Also note that when a processing module processes event data in response to a timer event, the processing module does not remove any data from the data structure that stores the input data. Rather, the older data in each data structure will be archived by archiving module 517 to an event log corresponding to that particular topic in a persistent storage device (e.g., event logs 503 of persistent storage device 352).

In one embodiment, archiving module 517 determines whether a particular event entry is older than a predetermined period of time from the current time. If there is an event older than a predetermined period of time, archiving module 517 removes the event entry from the corresponding data structure and stores in an event log corresponding to the data structure. In one embodiment, each event entry includes a timestamp representing time when the event was generated and data of the event. By comparing a timestamp of an event against the current system time, archiving module 517 can determine whether the event entry should be archived. In one embodiment, archiving module 517 periodically scans all of the data structures 801-803. For example, timer logic can periodically issues an archive event and in response to the archive event, task scheduler 511 invokes archiving module 517 in a worker thread and passes the pointers of the data structures to archiving module 517 to enable archiving module 517 to scan the data structures. Thus, the archiving module always removes and archive an event from the tail of the data structure, e.g., in a FIFO order. On the other hand, a processing module processes the data of the data structure in a FILO order.

Figure 9:
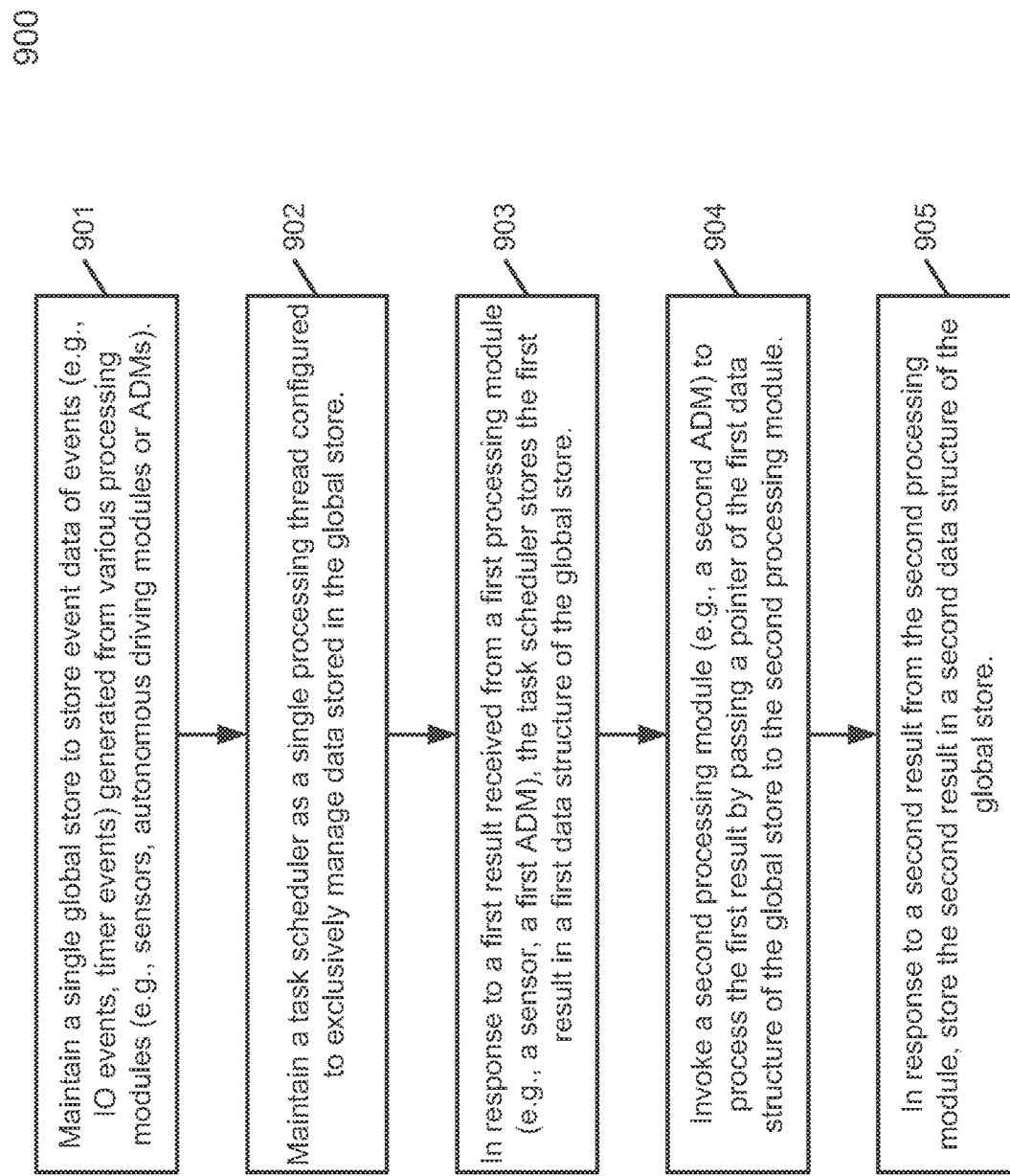
FIG. 9 is a flow diagram illustrating a process of operating an autonomous driving vehicle according to one embodiment.

FIG. 9 is a flow diagram illustrating a process of operating an autonomous driving vehicle according to one embodiment. Process 900 may be performed by processing logic which may include software, hardware, or a combination thereof. For example, process 900 may be performed by task scheduler 511. Referring to FIG. 9, in operation 901, processing logic maintains a single global store to store event data of events. The events may include IO events for sensors and/or timer events of processing modules of an ADV. In operation 902, processing logic maintains a task scheduler executed in a single thread that is responsible for managing data stored in the global store. In operation 903, in response to a first event indicating a first result received from a first processing module (e.g., a sensor or a first autonomous driving module), the task scheduler identifies and stores the first result to a corresponding first data structure of the global store. In operation 904, in response to a request from a second processing module (e.g., a second autonomous driving module) to process the first result, for example, via a timer event, the task scheduler invokes the second processing module and passes a pointer of the first data structure to the second processing module to allow the second processing module to process the data stored therein. In operation 905, in response to a second result from the second processing module, the task scheduler stores the second result in a second data structure of the global store. The second data structure is specifically configured to store output data generated from the second processing module.

Figure 10:
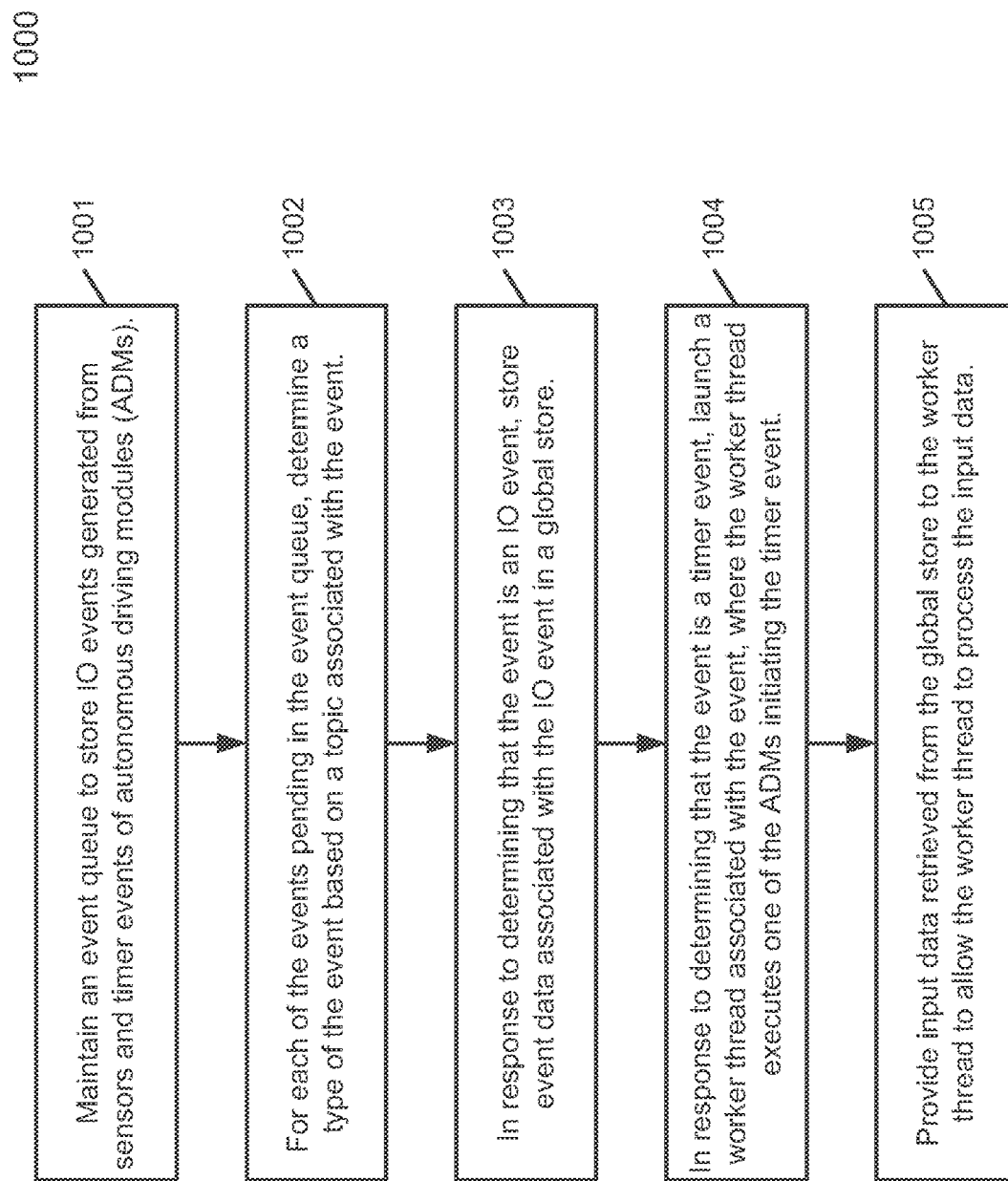
FIG. 10 is a flow diagram illustrating a process of operating an autonomous driving vehicle according to another embodiment.

FIG. 10 is a flow diagram illustrating a process of operating an autonomous driving vehicle according to another embodiment. Process 1000 may be performed by processing logic which may include software, hardware, or a combination thereof. For example, process 1000 may be performed by task scheduler 511. Referring to FIG. 10, in operation 1001, processing logic maintains an event queue to store IO events generated from various sensors and timer events generated for autonomous driving modules. For each of the events stored in the event queue, in operation 1002, processing logic determines a type of the event based on a topic associated with the event. In response to determining that the event is an IO event, in operation 1003, processing logic stores event data associated with the IO event in the global store. In operation 1004, in response to determining that the event is a timer event, processing logic launches or wakes up a worker thread associated with the timer event, where the worker thread executes one of the autonomous driving modules that triggered the timer event. In operation 1005, processing logic provides input data retrieved from the global store to the worker thread to allow the worker thread to process the input data.

Figure 11:
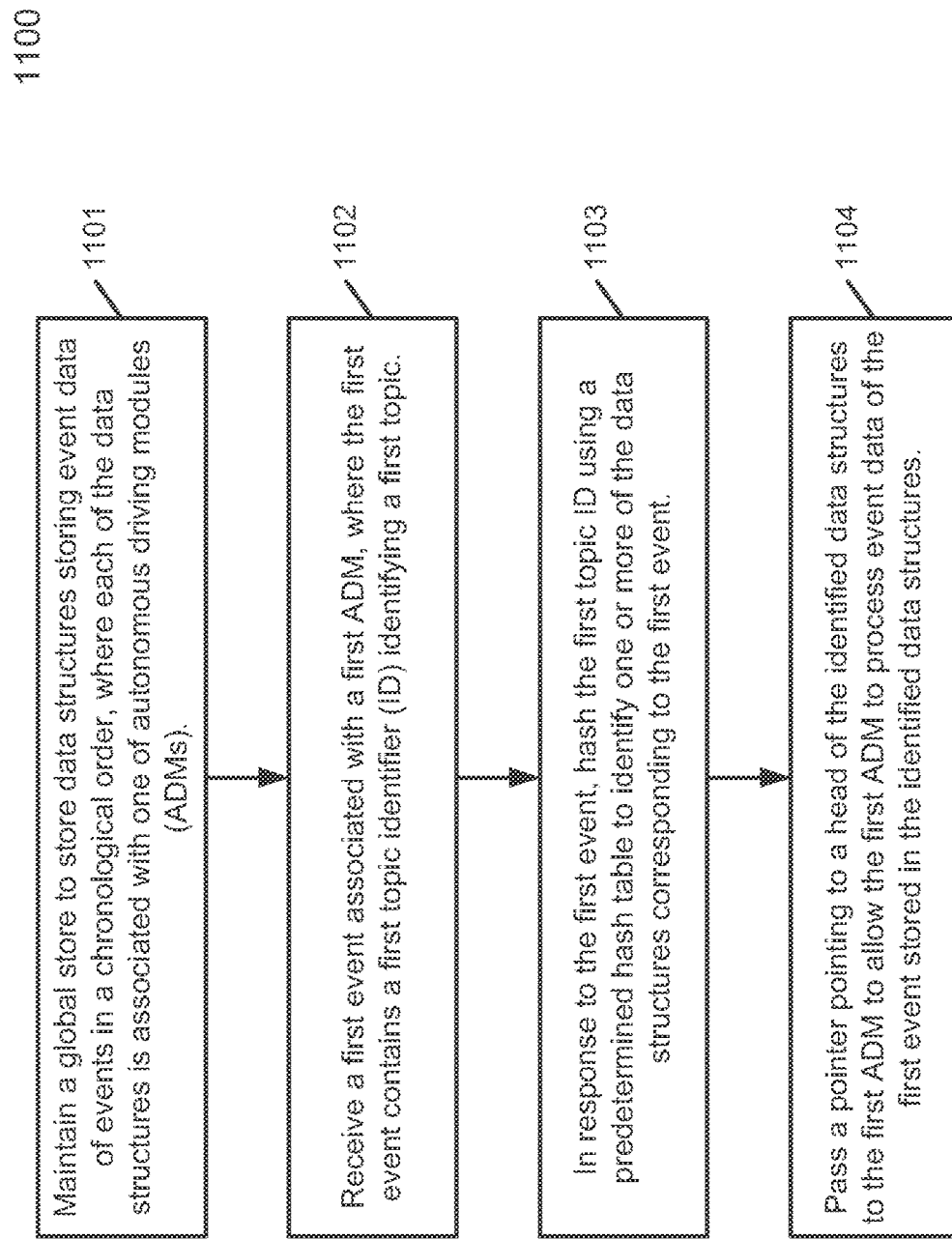
FIG. 11 is a flow diagram illustrating a process of operating an autonomous driving vehicle according to another embodiment.

FIG. 11 is a flow diagram illustrating a process of operating an autonomous driving vehicle according to another embodiment. Process 1100 may be performed by processing logic which may include software, hardware, or a combination thereof. For example, process 1100 may be performed by task scheduler 511. Referring to FIG. 11, in operation 1101, processing logic maintains a global store to store a number of data structures. Each of the data structures includes a number of entries and each entry stores data of a particular event in a chronological order. Each of the data structure is associated with one of the sensors or one of the autonomous driving modules of an ADV. In operation 1102, processing logic receives a first event associated with a first autonomous driving module, where the first event contains a first topic ID that identifies a first topic. In response to the first event, in operation 1103, processing logic hashes the first topic ID using a predetermined hash table to identify one or more first data structures corresponding to the first event. In operation 1104, processing logic passes pointers of the heads of the first data structures to the first autonomous driving module to allow the first autonomous driving module to process data of the first event.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
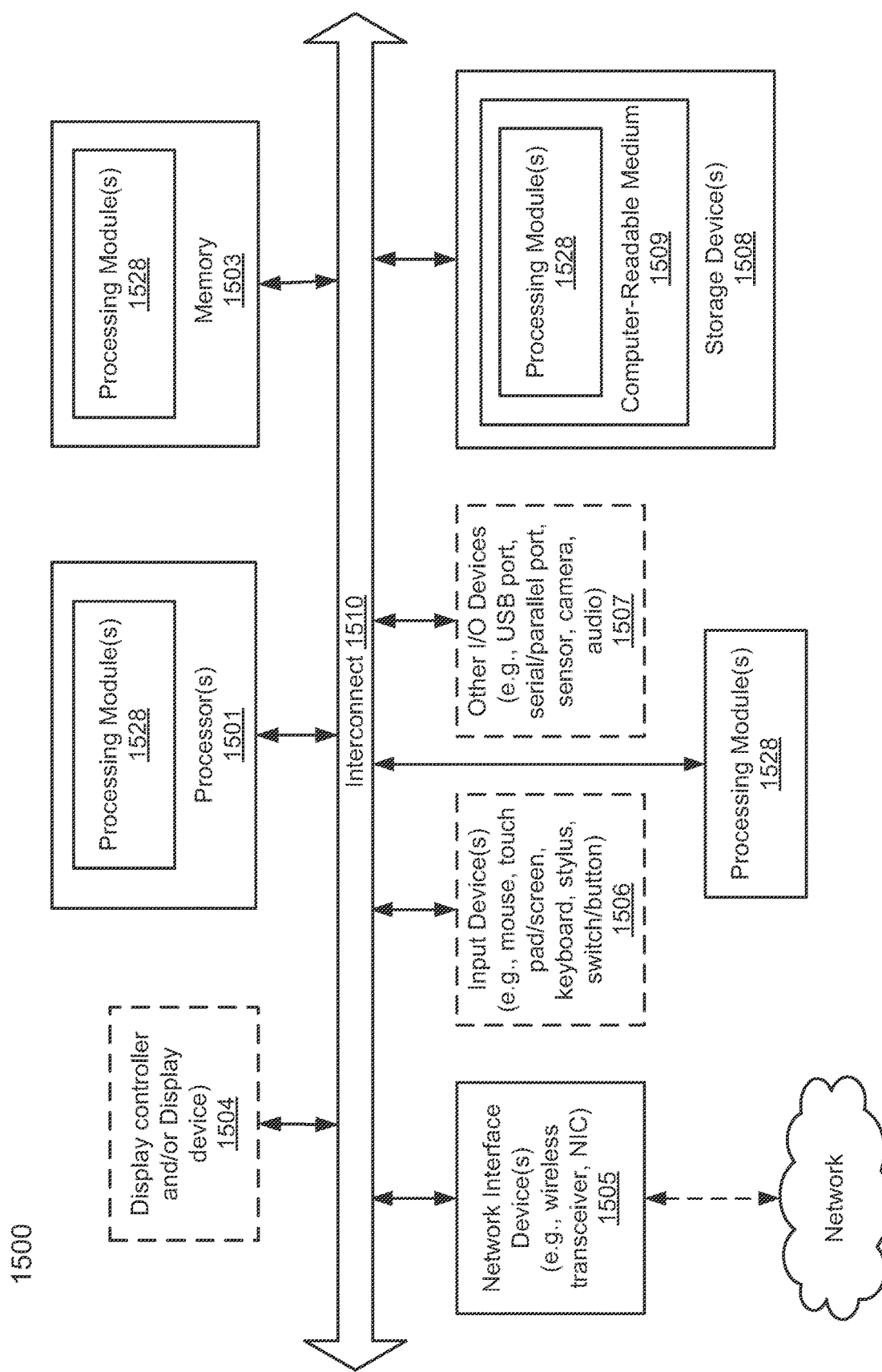
FIG. 12 is a block diagram illustrating a data processing system according to one embodiment.

FIG. 12 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or task scheduler 511. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    maintaining an event queue to store input and output (TO) events generated from a plurality of sensors and timer events generated for a plurality of autonomous driving modules, the autonomous driving modules including a perception module to perceive a driving environment surrounding the ADV based on sensor data obtained from the sensors and a planning module to plan a trajectory to autonomously drive the ADV through the driving environment; and
    for each of the events stored in the event queue, iteratively performing
        in response to determining that the event is an IO event, storing data associated with the IO event in a global store, and
        in response to determining that the event is a timer event,
            launching a worker thread associated with the timer event, including identifying a first autonomous driving module based on the timer event, and launching the worker thread to execute a first autonomous driving module that triggered the timer event, and
            identifying, by hashing an identifier of the timer event, one or more data structures of the global store to retrieve input data stored in the global store that is associated with the timer event; and
            providing the input data retrieved from the global store to the worker thread to allow the worker thread to process the input data;
    receiving a notification from the worker thread indicating that the input data has been processed;
    in response to the notification, extracting first output data from the notification; and
    storing the first output data in the global store.

2. The method of claim 1, wherein the input data is retrieved from a first data structure of the one or more data structures stored in the global store, wherein the first data structure is specified by hashing the identifier of the timer event.

3. The method of claim 1, wherein providing the input data to the first autonomous driving module comprises passing a memory pointer of a memory location of the global store to the worker thread without copying the input data.

4. The method of claim 1, wherein the first output data is stored in a first data structure of the one or more data structures of the global store, and wherein the first data structure is associated with the first autonomous driving module.

5. The method of claim 1, wherein each data structure of the global store is associated with one of the plurality of sensors or one of the plurality of autonomous driving modules.

6. The method of claim 1, wherein in response to the notification, one or more second data structures of the global store that are associated with the first autonomous driving module are identified, the one or more second data structures being used to store the first output data.

7. A non-transitory machine-readable medium having instructions stored therein, which when executed by a processor, cause the processor to perform operations, the operations comprising:

maintaining an event queue to store input and output (TO) events generated from a plurality of sensors and timer events generated for a plurality of autonomous driving modules, the autonomous driving modules including a perception module to perceive a driving environment surrounding the ADV based on sensor data obtained from the sensors and a planning module to plan a trajectory to autonomously drive the ADV through the driving environment; and for each of the events stored in the event queue, iteratively performing in response to determining that the event is an IO event, storing data associated with the IO event in a global store, and in response to determining that the event is a timer event, launching a worker thread associated with the timer event, including identifying a first autonomous driving module based on the timer event, and launching the worker thread to execute a first autonomous driving module that triggered the timer event;

identifying, by hashing an identifier of the timer event, one or more data structures of the global store to retrieve input data stored in the global store that is associated with the timer event; and providing the input data retrieved from the global store to the worker thread to allow the worker thread to process the input data receiving a notification from the worker thread indicating that input data has been processed;

in response to the notification, extracting first output data from the notification; and storing the first output data in the global store.

8. The machine-readable medium of claim 7, wherein the input data is retrieved from a first data structure of the one or more data structures stored in the global store, wherein the first data structure is specified by hashing the identifier of the timer event.

9. The machine-readable medium of claim 7, wherein providing the input data to the first autonomous driving module comprises passing a memory pointer of a memory location of the global store to the worker thread without copying the input data.

10. The machine-readable medium of claim 7, wherein the first output data is stored in a first data structure of the one or more data structures of the global store, and wherein the first data structure is associated with the first autonomous driving module.

11. The machine-readable medium of claim 7, wherein each data structure of the global store is associated with one of the plurality of sensors or one of the plurality of autonomous driving modules.

12. The machine-readable medium of claim 7, wherein in response to the notification, one or more second data structures of the global store that are associated with the first autonomous driving module are identified, the one or more second data structures being used to store the first output data.

13. A data processing system, comprising:

a processor; and a memory coupled to the processor to store instructions, which when executed by the processor, cause the processor to perform operations, the operations including maintaining an event queue to store input and output (TO) events generated from a plurality of sensors and timer events generated for a plurality of autonomous driving modules, the autonomous driving modules including a perception module to perceive a driving environment surrounding the ADV based on sensor data obtained from the sensors and a planning module to plan a trajectory to autonomously drive the ADV through the driving environment, and for each of the events stored in the event queue, iteratively performing in response to determining that the event is an IO event, storing data associated with the IO event in a global store, and in response to determining that the event is a timer event, launching a worker thread associated with the timer event, including identifying a first autonomous driving module based on the timer event, and launching the worker thread to execute a first autonomous driving module that triggered the timer event; and providing the input data retrieved from the global store to the worker thread to allow the worker thread to process the input data receiving a notification from the worker thread indicating that the input data has been processed;

in response to the notification, extracting first output data from the notification; and storing the first output data in the global store.

14. The system of claim 13, wherein the first input data is retrieved from a first data structure stored in the global store, wherein the first data structure is specified by the timer event.

15. The system of claim 13, wherein providing the input data to the first autonomous driving module comprises passing a memory pointer of a memory location of the global store to the worker thread without copying the input data.

16. The system of claim 13, wherein the first output data is stored in a first data structure of the one or more data structures of the global store, and wherein the first data structure is associated with the first autonomous driving module.

17. The system of claim 13, wherein each data structure of the global store is associated with one of the plurality of sensors or one of the plurality of autonomous driving modules.

18. The system of claim 13, wherein in response to the notification, one or more second data structures of the global store that are associated with the first autonomous driving module are identified, the one or more second data structures being used to store the first output data.

* * * * *